United States Patent [19]

Davis

[11] 3,731,978
[45] May 8, 1973

[54] HUBCAP FOR A VEHICLE WHEEL ASSEMBLY

[75] Inventor: Dalton M. Davis, Palos Verdes, Calif.

[73] Assignee: Pyramid Enterprises, Inc., Torrance, Calif.

[22] Filed: Dec. 21, 1970

[21] Appl. No.: 100,097

[52] U.S. Cl. .......................................... 301/108 SC
[51] Int. Cl. .............................................. B60b 7/06
[58] Field of Search ..................... 301/108 SC, 108 S, 301/37 SC, 37 R

[56] References Cited

UNITED STATES PATENTS 2,012,449    8/1935    Hamilton ..................... 301/37 S X
3,250,572    5/1966    Walker ............................ 301/65
1,903,189    3/1933    Miller .......................... 301/108 X

FOREIGN PATENTS OR APPLICATIONS 362,070    12/1931    Great Britain .............. 301/108 SC

OTHER PUBLICATIONS

Hurst – Motor Trend page 45 Apr. 1965.

Primary Examiner—Richard J. Johnson
Attorney—Jack C. Munro

[57] ABSTRACT

A hubcap for the central hub opening of a spider in a vehicle wheel assembly which employs a plurality of aligning pins to insure the exact positioning of the hubcap upon the spider.

3 Claims, 5 Drawing Figures

PATENTED MAY 8 1973　　3,731,978
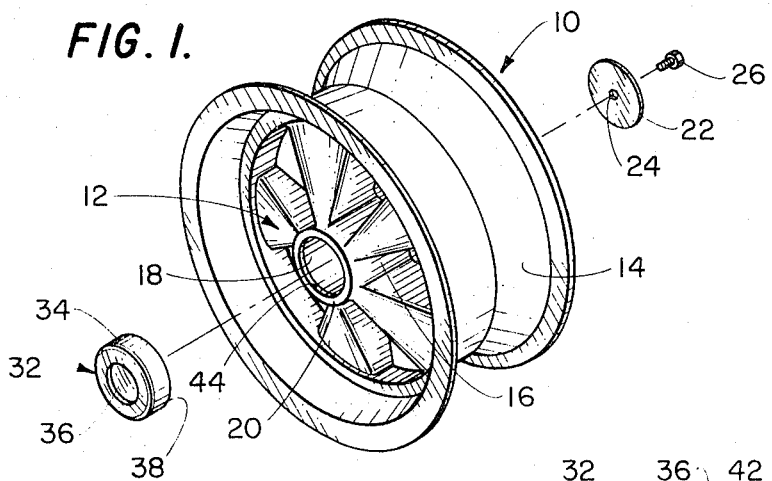
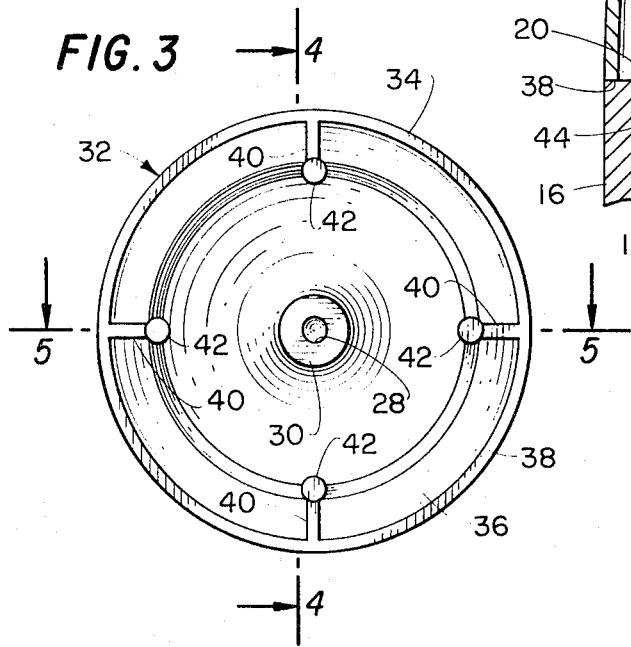
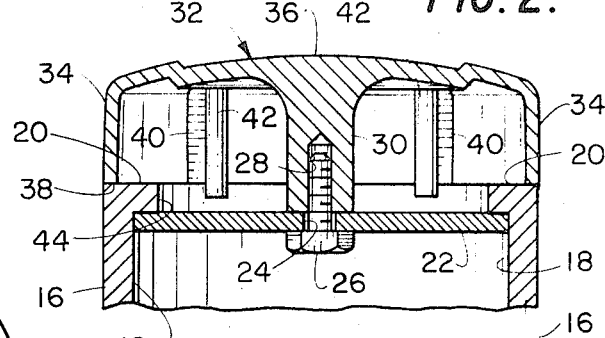
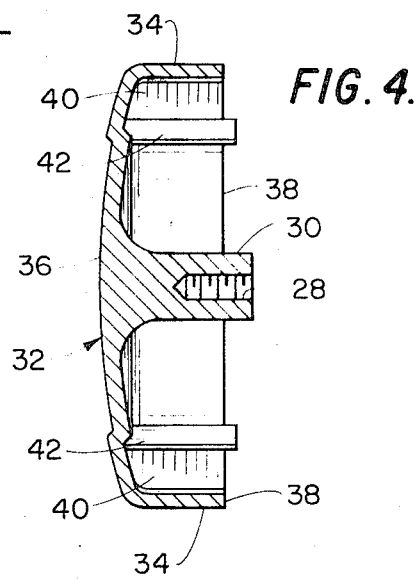
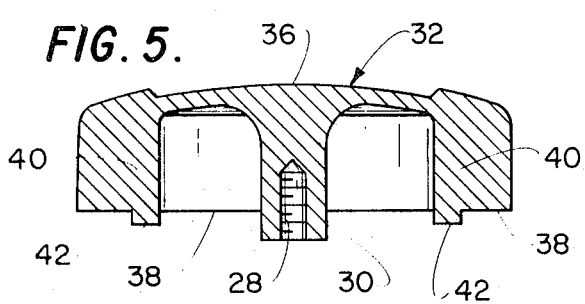
INVENTOR.
DALTON M. DAVIS
BY JACK C. MUNRO
AGENT

HUBCAP FOR A VEHICLE WHEEL ASSEMBLY

BACKGROUND OF THE INVENTION

The field of this invention relates to vehicle wheel assemblies and more particularly to an ornamental spoked wheel assembly for an automobile wherein a hubcap is employed to close off the hub opening located within the spider.

It has been common practice for a great number of years to mount the inflatable tire, upon which the vehicle moves, upon a steel rim and to secure the steel rim to the wheel drum of the vehicle. It has been common practice to form the steel rim as an integral unit in rough cast form. In an effort to improve the appearance of the spider section of the wheel the portion which is centrally located with respect to the rim, it has been common to employ the use of a rather large diameter hubcap which has been designed to be ornamental and pleasing to the eye. Heretofore, a large number of different types of hubcaps of various designs have been employed.

In the past few years it has been common to make ornamental the spider portion of the wheel itself thereby eliminating the need for the large diameter hubcap. Normally, such spider sections are configured in a particular manner as having a plurality of radial spokes extending from a small diameter central hub section with the entire spider assembly being chrome plated into an extremely shiny overall appearance. Such types of vehicle wheel assemblies are highly desired by certain types of people, primarily individuals of the younger generation.

Within the spider there is only one part which can be considered unsightly in appearance. This part is the small diameter opening through the central hub of the spider. In the past, it has been common to cover this opening by means of a snap-on type of small diameter hubcap. Heretofore, such small diameter hubcaps have been difficult to locate with respect to the spider with a strong type of positive lock. Heretofore, it has been common for the locking arrangement of such a hubcap to become loose, causing the hubcap to be removed and lost in operation of the vehicle. However, during the manufacture of the spider and assembling of such, the exact positioning of the hubcap is not easily accomplished, and therefore is quite time consuming in the manufacturing process. Because the purchasers of such ornamental wheel assemblies require that such wheel assemblies be made to absolute perfection, the location of the hubcap must be exactly concentric with the overall wheel assembly. If such location is not accomplished, a substantial loss in sales will surely occur.

It would be desirable to design a small diameter hubcap for the small diameter central hub opening of a wheel assembly, wherein the hubcap can be accurately positioned upon the spider with ease and is to be retained thereon by means of a positive lock assembly which absolutely precludes inadvertent loosening of the hubcap and losing such during the operation of the vehicle.

SUMMARY OF THE INVENTION

The hubcap of this invention is to be applied to the small diameter central hub opening of a spider vehicle wheel assembly. The central hub opening within the spider is to have an enlarged diameter section which is to cooperate with a washer. The washer is to be retained in the hub by means of an annular shoulder integrally formed within the hub. The hubcap of this invention is to be formed with an outer ornamental surface of a generally cylindrical configuration. The rim of the hubcap is adapted to come into abutting contact with the hub of the spider adjacent the periphery of the hub. Integrally secured to the hubcap and extending interiorly thereof are a plurality of aligning pins. The aligning pins are spaced a predetermined distance from the wall of the hubcap so that such pins will come into contactual relationship with the surface of the opening within the hub. The aligning pins are to be equiangularly displaced about the center point of the hubcap. Centrally disposed interiorly of the hubcap and secured thereto is an internally threaded boss. With the hubcap positioned in cooperation with the hub of the spider, a conventional fastener can be passed through the washer with the head of the fastener in abutting contact with the washer and the threads of the fastener cooperating with the threaded portion of the boss.

BRIEF DESCRIPTION OF THE DRAWING

FIG. 1 is an exploded perspective view of the vehicle wheel assembly which employs the hubcap of this invention;

FIG. 2 is a cross sectional view showing the hubcap of this invention as it is to be mounted upon the hub of the spider;

FIG. 3 is an interior view of the hubcap of this invention showing more clearly the arrangement of the aligning pins and the attaching boss;

FIG. 4 is a cross sectional view through the hubcap of this invention taken along line 4—4 of FIG. 3; and FIG. 5 is a cross sectional view of the hubcap of this invention taken along line 5—5.

DETAILED DESCRIPTION OF THE SHOWN EMBODIMENT

Referring particularly to the drawing, there is shown in FIG. 1 a wheel assembly 10 which includes a spider 12 secured within a tire supporting rim 14. The spider 12 includes a central hub 16 which has a central hub opening 18 formed therein. One end of opening 18 is to cooperate with a portion of the drive drum (not shown) of a vehicle. The other end of opening 18 terminates in an annular shoulder 20, the function of which will be described further on in the specification.

The shoulder 20 is to be employed to effect in place retention of a washer 22 as shown in FIG. 2 of the drawing. Washer 22 includes a central aperture 24 which is adapted to cooperate with a conventional bolt fastener 26. The threaded portion of the fastener 26 is to cooperate within a threaded opening 28 of a boss 30. Boss 30 is integrally secured to the hubcap 32 of this invention and extends centrally therefrom. Hubcap 32 of this invention has a general cylindrical configuration having a circular shaped sidewall 34 and a contoured end wall 36. It is to be understood that the basic ornamental configuration of the hubcap 32 of this invention is to be considered a matter of design.

The edge 38 of the side wall 34 is adapted to come into contact with the face of the central hub 16. The size of the hubcap 32 is selected so as to have approximately the same outer dimension as that of the central hub 16. Also, the length of the boss 30 is selected so that the edge 38 which is to contact the hub 16, that the forward end of the boss 30 is just in abutting contact therewith or closely adjacent the washer 22.

Secured to the interior portion of the side wall 34 are a plurality of extensions 40. Each extension 40 extends in a radial direction with respect to the hubcap 32 with each extension 40 being equiangularly displaced about the side wall 34. Actually, four in number of such extensions 40 are employed with each extension being spaced 90° apart from the next adjacent extension. However, it is to be understood that the number of such extensions 40 is merely a choice of design as it may be desirable to employ only three such extensions or five or more.

Integrally secured at the free end of each extension 40 is an aligning pin 42. Each aligning pin 42 is spaced inwardly from the side wall 34 an amount determined by the length of its extension 40. It is desired that each of the aligning pins 42 be located in a given circle which is concentric to the center point of the hubcap 32. It is further desired that each of the aligning pins 42 will just come into contactual relationship with the opening 44 defined by the inner wall of the annular shoulder 20.

To effect installation of the hubcap 32 of this invention upon the hub 16, the procedure is as follows: It will be presumed that the spider 12 has been manufactured and secured to the rim 14. To complete the manufacturing process, it is desired to close off the opening 18 of the central hub 16. To effect such closing off, the hubcap 32 of this invention is employed.

The first step to installation requires the locating of the washer 22 adjacent the annular shoulder 20. The operator then grasps the hubcap 32 and places the edge 38 of the side wall 34 adjacent the outer face of the central hub 16. Accurate concentric placement of the hubcap 32 with respect to the central hub 16 is insured due to the fact that the aligning pins 42 co-operate with the wall of the opening 44. The operator then places the fastener 26 through the central aperture 24 of the washer 22 into cooperative relationship with the threaded opening 28 of the boss 30. Upon adequate tightening of the fastener 26, an extremely positive securing occurs of the hubcap 32 with respect to the central hub 16.

It is to be understood that the hubcap 32 employed within this invention can be made of any numerous materials of construction. It is envisioned that the normal material of construction would be aluminum or aluminum alloy or steel or steel alloy. Further, it is envisioned that the hubcap 32 of this invention would be formed by means of die casting. However, again, the method of forming is to be considered a matter of choice or design.

What is claimed is:

1. In combination with the central hub of a spider of a vehicle wheel assembly, said central hub having a central opening assembly therethrough, said central opening assembly being divided into a main enlarged opening and a smaller diametered opening, the smaller diametered opening formed by an annular flange extending within said main enlarged opening, a hubcap to effect closing of said central opening assembly, said hubcap comprising:
   alignment means secured to said hubcap to position said hubcap in a particular desired location with respect to said central hub, said alignment means comprises a plurality of spaced apart pins, said pins extending into said smaller diametered opening and into contactual relationship with the inner surface of said annular flange to effect the desired positioning of said hubcap thereon; and
   securing means to fixedly position said hubcap upon said central hub, a boss internally secured to said hubcap at the center thereof, a fastener located interiorly of said hub and is to be connected between said hub and said boss to thereby immovably secure said hubcap to said hub.

2. In combination with the central hub of a spider of a vehicle wheel assembly, said central hub having a central opening assembly therethrough, said central opening assembly being divided into a main enlarged opening and a smaller diametered opening, the smaller diametered opening formed by an annular flange extending within said main enlarged opening, a hubcap to effect closing of said central opening assembly, said hubcap comprising:
   alignment means secured to said hubcap to position said hubcap in a particular desired location with respect to said central hub, said alignment means comprises a plurality of spaced apart pins, said pins extending into said smaller diametered opening and into contactual relationship with the inner surface of said annular flange to effect the desired positioning of said hubcap thereon; and
   securing means to fixedly position said hubcap upon said central hub, said securing means includes a washer located within said central hub and in abutting contact with said annular flange.

3. The combination as defined in claim 2 wherein:
   said securing means further includes an internally threaded boss which is centrally secured upon said hubcap, a fastener to connect together said boss and said washer.

* * * * *